Oct. 31, 1933.  A. PODMORE  1,933,184

SHARPENING APPARATUS FOR ROTARY CUTTERS

Filed Feb. 10, 1928  2 Sheets-Sheet 1

A. Podmore
INVENTOR

By: Marks & Clerk
ATTYS.

Oct. 31, 1933.     A. PODMORE     1,933,184
SHARPENING APPARATUS FOR ROTARY CUTTERS
Filed Feb. 10, 1928     2 Sheets-Sheet 2
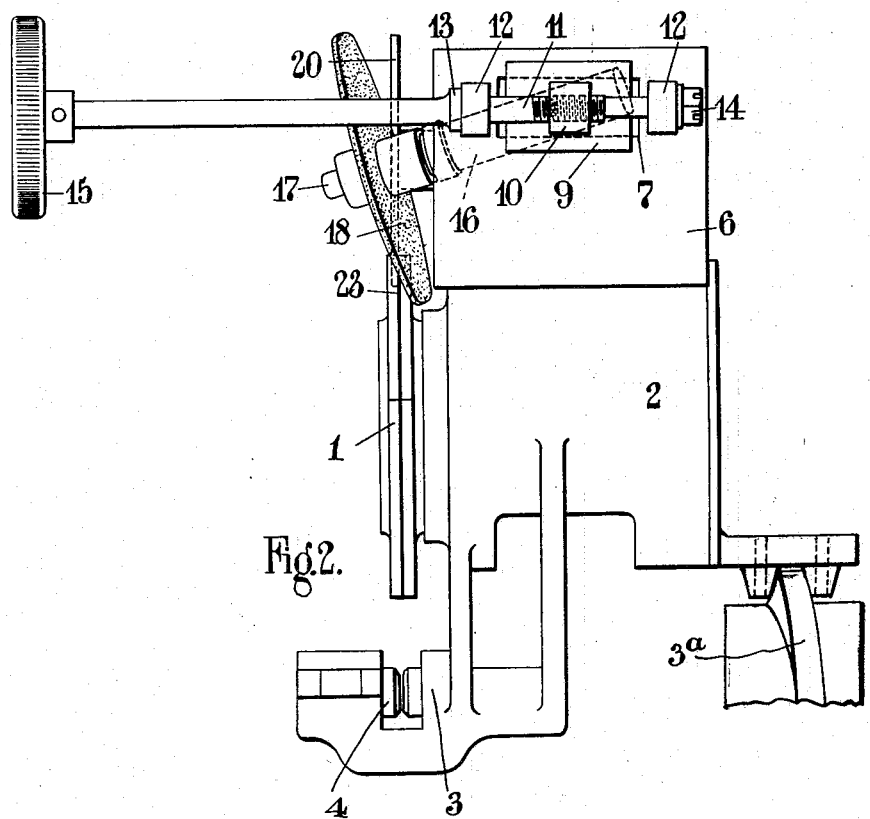
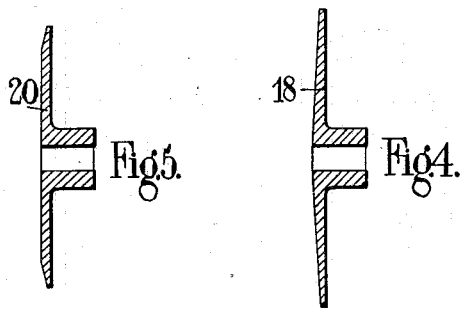
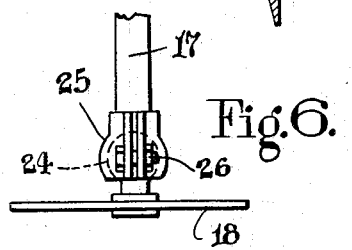

Patented Oct. 31, 1933

1,933,184

UNITED STATES PATENT OFFICE 1,933,184

SHARPENING APPARATUS FOR ROTARY CUTTERS

Arthur Podmore, London, England, assignor to American Machine and Foundry Company, New York, N. Y.

Application February 10, 1928, Serial No. 253,490, and in Great Britain February 18, 1927

9 Claims. (Cl. 51—248)

This invention relates to a sharpening device for cutting mechanisms of the type in which a cutting blade having an eccentric cutting edge is rotated or revolved about an axis and is also given an axial reciprocatory movement.

The invention particularly relates to cutting mechanisms for cigarette making machines, in which the cutting blade is revolved to cause it to periodically cut across the cigarette rod, and is axially reciprocated in a direction parallel to the cigarette rod so that during the actual cutting of the rod, the cutting blade will move with the rod at substantially the same speed in order to cut squarely across the same without interrupting its movement.

Difficulty has been experienced in sharpening these cutting blades, due to the eccentricity of the cutting edge, and to the fact that this edge must be sharpened while the blade is both revolving and moving axially.

I have discovered that this sharpening may be effected by suitably positioning a stationary sharpening element, and the present invention therefore resides, in a cutting mechanism of the type referred to above, in a sharpening element mounted in a fixed position with respect to the rotary and reciprocating movements of said blade, and means supporting said element with its operative surface at an inclination such that all parts of the eccentric cutting edge will engage therewith during the rotary and reciprocating movements of the blade.

Further features of the invention will be hereinafter described and defined in the claims.

The accompanying diagrammatic drawings illustrate the invention as applied to a machine for cutting cigarette rods into lengths, Figure 1 being an end view looking on the cutter, Figure 2 a side view, and

Figure 3 a plan.

Figure 4 is a cross section of one form of sharpening disc,

Figure 5 is a similar view of one form of burr-removing disc, while

Figure 6 is a detail view of a universal joint support for the sharpening disc.

Figure 1:
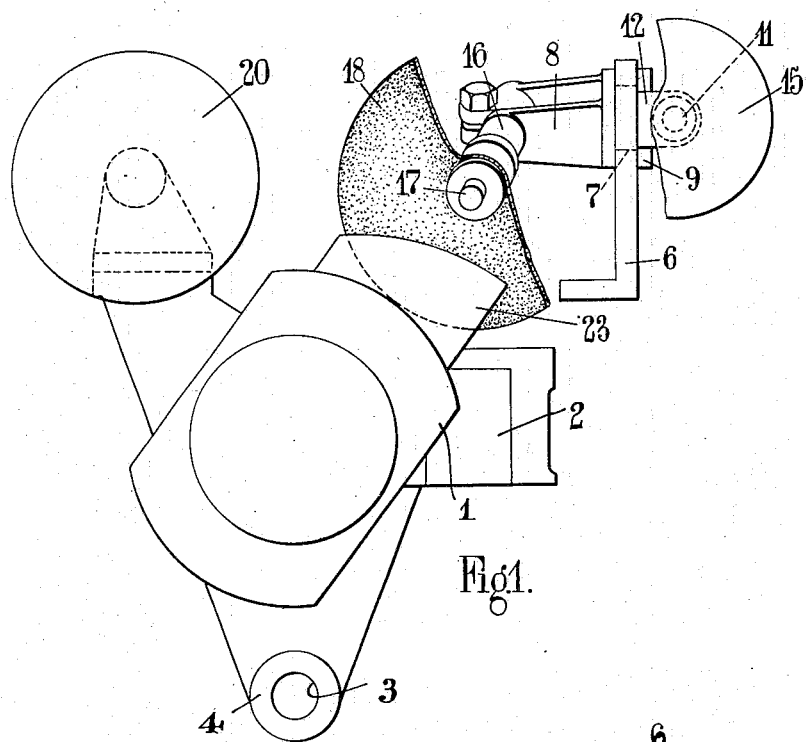
Figure 3:
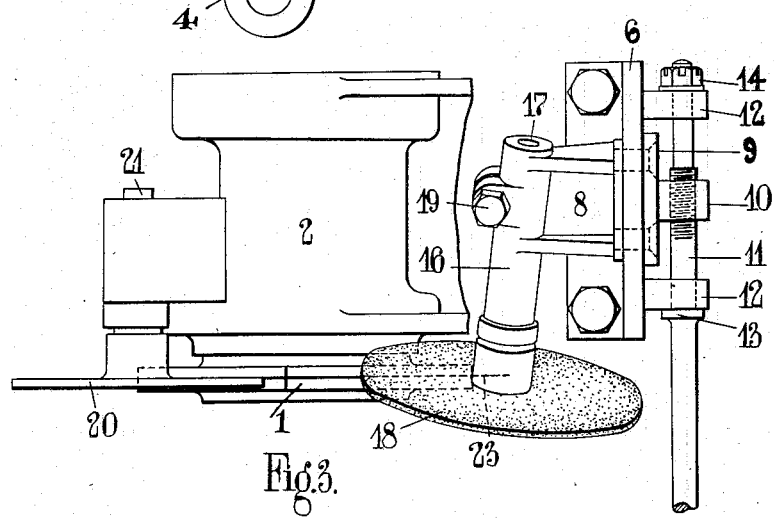

The invention is illustrated in the accompanying drawings as applied to the sharpening of the rotary cutting blade of a known form of cigarette rod cutting mechanism, in which the cutting blade 23, provided as shown particularly in Figure 1, with an eccentric cutting edge, is supported by a holder 1, which is rotatably supported in a carriage 2, which carries the guide 3 for the cigarette rod, and the ledger plate 4 with which the blade 23 coacts in cutting the cigarette rod. The carriage 2 as known in this type of cigarette rod cutting mechanism, is mounted for reciprocatory movement upon a suitable part of the machine frame, and is given a reciprocatory movement by a suitable cam or like device 3a. This reciprocatory movement is parallel to the direction of movement of the cigarette rod through the guide 3, and is such that during the actual cutting of the rod, the cutting blade moves with the rod at the same speed, so that a straight cut across the rod is obtained. As such reciprocating cutting mechanisms are well known in the art, it is considered unnecessary to illustrate the same more fully in the present application, it being sufficient to state that the cutting blade 23 is given a rotary or revolving movement about an axis, and is also given a reciprocatory movement parallel to its axis of rotation.

To enable the rotating and reciprocating cutting blade 23 to be sharpened during its rotating and reciprocating movement, a bracket or member 6 is mounted upon a suitable stationary part of the machine (not shown) so that it lies in a plane parallel to the axis of the cigarette rod and in suitable proximity to the rotary cutting knife. The bracket is provided with a slot 7 which also lies parallel to said axis.

A second bracket 8 is provided and has a part adapted to seat within the slot 7 with a sliding fit, being held therein by a suitable back plate or plates 9. A lug 10 integral with this bracket 8 projects completely through the slotted bracket and forms a nut adapted to co-operate with a screw member or spindle 11 mounted for rotation in lugs 12 on the first-mentioned bracket 6 but held against axial or longitudinal movement by the collar 13 and nut 14. The spindle 11 is provided with a suitable handwheel 15 whereby it may be rotated to cause the second-mentioned bracket 8 to be traversed in the slot 7 in which it is seated.

The second-mentioned bracket 8 on the side remote from the adjusting spindle is provided with a bearing 16 for a spindle 17 adapted to carry an emery disc 18. The bearing may be split and means, such as the nut and screw 19, provided for tightening it upon the spindle 17. The axis of this bearing 16 is inclined in two directions; one for the purpose of forming a bevel on the cutting edge of the knife and, secondly, an inclination such that there is a lead on the surface of the emery wheel corresponding to the extent of axial travel of the knife while engaging the emery wheel so that all points on the eccentric edge of the blade will come into contact with the sharpening surface with the requisite pressure. If desired, the mounting of the emery wheel spindle in its bracket may be of a swivel or ball type, as shown in Figure 6, so that the necessary adjustments of the inclinations may be obtained according to the travel of the knife, the width of the blade and the eccentricity of the cutting edge. In Fig. 6 the sharpening disc 18 is provided with a ball 24 fitting within a socket 25 suitably secured to the spindle 17 and adapted to be clamped in adjusted positions by a bolt 26.

The sharpening surface of the emery wheel 18 may be flat, slightly coned, as indicated in Figure 4, or any other suitable contour whereby the desired result is obtained.

The emery wheel 18 may be mounted upon the spindle 17 so that it is free to turn by the frictional contact of the cutter or it may be positively driven if desired.

A second emery wheel 20 is provided at a suitable position for removing any burr on the knife caused by the sharpening wheel 18. This burr-removing wheel may be a flat disc having a bevelled edge and may be mounted freely upon a spindle 21 so as to be revolved by the friction of the knife. The burr-removing wheel may be carried upon the reciprocating housing or carriage 2 carrying the cutters 23 or it may be mounted upon a stationary part of the machine, but in the latter case it would have to be mounted inclined in a somewhat similar manner to the disc 18 so as to allow for the axial reciprocation of the cutters.

Although the invention has been particularly described with reference to the cutting of cigarette rods, it may be applied to other machines where similar conditions obtain.

I claim:

1. In a cutting mechanism including a cutting blade rotated about an axis having a bevelled cutting edge which is eccentric with respect to said axis, and having an axial reciprocatory movement, a sharpening element mounted in a fixed position with respect to both the rotary and reciprocating movements of said blade, and means supporting said element with its operative surface at an inclination corresponding to that of the bevel on said cutting edge, and at an additional inclination such that all parts of the eccentric cutting edge will engage therewith while the blade is both rotating and reciprocating relatively thereto.

2. In a cutting mechanism including a cutting blade rotated about an axis having a bevelled cutting edge which is eccentric with respect to said axis, and having an axial reciprocatory movement, a circular sharpening disc mounted in a fixed position with respect to both the rotary and reciprocating movements of said blade, and means supporting said disc with its operative surface at an inclination corresponding to that of the bevel on said cutting edge, and at an additional inclination such that all parts of the eccentric cutting edge will engage therewith while the blade is both rotating and reciprocating relatively thereto.

3. In a cutting mechanism including a cutting blade rotated about an axis having a bevelled cutting edge which is eccentric with respect to said axis, and having an axial reciprocatory movement, a sharpening disc rotatable about its axis and mounted in a fixed position with respect to both the rotary and reciprocating movements of said blade, and means supporting said disc with its operative surface at an inclination corresponding to that of the bevel on said cutting edge, and at an additional inclination such that all parts of the eccentric cutting edge will engage therewith while the blade is both rotating and reciprocating relatively thereto.

4. In a cutting mechanism including a cutting blade rotated about an axis having a bevelled cutting edge which is eccentric with respect to said axis, and having an axial reciprocatory movement, a sharpening device consisting of a stationary supporting bracket, a spindle mounted in said bracket at both a downward and a lateral inclination to the line of reciprocating movement of said blade, and a sharpening disc supported by said spindle, with its operative surface at an inclination corresponding to that of the bevel on said cutting edge, and at an additional inclination such that all parts of the eccentric cutting edge will engage therewith while the blade is both rotating and reciprocating relatively thereto.

5. In a cutting mechanism including a cutting blade rotated about an axis having a bevelled cutting edge which is eccentric with respect to said axis, and having an axial reciprocatory movement, a sharpening device including a stationary support, a bracket mounted upon said support, a sharpening element supported by said bracket with its operative surface at an inclination corresponding to that of the bevel on said cutting edge, and at an additional inclination such that all parts of the eccentric cutting edge will engage therewith while the blade is both rotating and reciprocating relatively thereto, and means for adjusting said bracket in a direction substantially parallel to the axis of rotation of said blade.

6. In a cutting mechanism including a cutting blade rotated about an axis having a bevelled cutting edge which is eccentric with respect to said axis, and having an axial reciprocatory movement, a sharpening element mounted in a fixed position with respect to both the rotary and reciprocating movements of said blade, means supporting said element, and means for adjusting said element to dispose the operative surface thereof at an inclination corresponding to that of the bevel on said cutting edge, and at an additional inclination such that all parts of the eccentric cutting edge will engage therewith while the blade is both rotating and reciprocating relatively thereto.

7. In a cutting mechanism including a rotary cutting blade having an eccentric cutting edge and having an axial reciprocatory movement, a sharpening device consisting of a supporting member fixed with respect to the rotary and reciprocating movements of said blade, a sharpening element supported by said member, with its operative surface at an inclination such that all parts of the eccentric cutting edge will engage therewith during the rotary and reciprocating movements of said blade, and a universal joint connection between said element and said supporting member permitting variation of the inclination of said surface.

8. In a cutting mechanism including a rotary cutting blade having an eccentric cutting edge and having an axial reciprocatory movement, a sharpening device consisting of a supporting bracket fixed with respect to the rotary and reciprocating movements of said blade, a spindle mounted in said bracket, a sharpening disc supported by said spindle with its operative surface at an inclination such that all parts of the eccentric cutting edge will engage therewith during the rotary and reciprocating movements of said blade, and a ball and socket joint between said disc and said spindle permitting variation of the inclination of said sharpening disc.

9. In a cutting mechanism including a rotary cutting blade having an eccentric cutting edge and a reciprocating carriage on which said blade is mounted, a sharpening element mounted in a fixed position with respect to the movements of said carriage and blade, with its operative surface at an inclination such that all parts of the eccentric cutting edge will engage therewith during the rotary and reciprocating movements of the blade, and a device mounted on said reciprocating carriage and arranged to engage the opposite side of said blade to remove burr therefrom.

ARTHUR PODMORE.